United States Patent
Koorapaty et al.

(10) Patent No.: US 6,243,588 B1
(45) Date of Patent: Jun. 5, 2001

(54) MOBILE POSITIONING METHOD FOR A PORTABLE COMMUNICATIONS DEVICE USING SHORTENED REPETITIVE BURSTS

(75) Inventors: Havish Koorapaty, Cary, NC (US); Patrick Nils Lundqvist, Solna (SE); Alex Krister Raith, Durham, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/037,988

(22) Filed: Mar. 10, 1998

(51) Int. Cl.[7] .................................................. H04Q 7/20
(52) U.S. Cl. .................... 455/456; 455/524; 342/457; 370/252
(58) Field of Search ................................. 455/456, 457, 455/433, 524, 550, 566, 67.1, 67.4, 67.7, 115, 422; 342/457, 357.02; 370/252, 351

(56) References Cited

U.S. PATENT DOCUMENTS

| | | |
|---|---|---|
| 5,327,144 | 7/1994 | Stilp et al. . |
| 5,608,410 | 3/1997 | Stilp et al. . |
| 5,945,948 * | 8/1999 | Buford et al. ........................ 342/457 |
| 6,031,490 * | 2/2000 | Forssen et al. ................... 455/456 X |

FOREIGN PATENT DOCUMENTS 2316823   3/1998 (GB).

* cited by examiner

*Primary Examiner*—Lee Nguyen
*Assistant Examiner*—Philip J. Sabutka
(74) *Attorney, Agent, or Firm*—Wood, Phillips, VanSanten, Clark & Mortimer (57) ABSTRACT

Standard mobile cellular telephones use shortened burst signal transmissions to synchronize the transmission of a call over a cellular telephone network. These shortened bursts as well as other traffic channel bursts can be used to locate the position of the cell phone. In operation, a primary base station sends a traffic channel designation message to a selected mobile phone which then initiates selected traffic channel burst transmissions, such as shortened bursts, over an interval of five seconds or less. The primary station and at least two other neighboring base stations receive these burst transmissions and determine their respective distances from the cell phone based upon the time of arrival of the bursts or some other suitable distance related measurement. A command center determines the location of the cell phone by triangulating the distance measurements of the base stations.

37 Claims, 3 Drawing Sheets

| G1 | R S D S D V S D W S D X S D Y S | G2 |

G1: 3 symbol length guard time.
R: 3 symbol length ramp time.
S: 14 symbol length sync word; the mobile station uses its assigned sync word.
D: 6 symbol length CDVCC; the mobile station uses its assigned DVCC.
G2: 22 symbol length guard time. The first 3 symbols of G2 consist of RAMP.
V = 0000
W = 00000000
X = 000000000000
Y = 0000000000000000

MOBILE POSITIONING METHOD FOR A PORTABLE COMMUNICATIONS DEVICE USING SHORTENED REPETITIVE BURSTS

BACKGROUND OF THE INVENTION

1. Field of the Invention

The present invention relates to mobile communications devices such as cell telephones and to methods for determining accurately and precisely the positions of such devices within a network area. Cell telephones can therefore be located in order to dispatch emergency police or medical assistance to a caller or for any other purpose.

2. Background of the Invention

New rules in the United States require that by 2001 mobile cellular telephones must be located, based solely on the location of the point of origination of their transmissions. The initial standard is that the cellular telephones in any given network area making an emergency call must be located accurately with a root mean square error less than 125 meters. It would be preferred to implement this standard without retro-fitting existing cellular phones.

Existing base stations in Industry Standard ("IS") - 54 and 136 TDMA systems generally employ location verification modules ("LVM"s) that verify data in mobile station voice transmissions at the time of handover from one base station to another. For a TDMA call to proceed, the timing of the mobile station and the base station must be closely synchronized. Under IS-54 and -136, the mobile station provides, or can be requested to provide, a "shortened burst" transmission at the time the call is set up or for any handoff from one base station to another in the network. Under IS-54, using an analog control channel, the shortened bursts are transmitted by default. The IS-136 control channel is digital and a shortened burst must be requested by the base station. Shortened bursts are time slot signal transmissions of up to about 5.58 milliseconds each, which repeat every 20 milliseconds for a period of not more than 5 seconds. These bursts are used to synchronize time slotted voice transmissions between the mobile unit and base stations. In accordance with the invention, these bursts are also well suited for use in accurately detecting the position of the mobile unit.

The shortened bursts are used to measure quantities related to the distance of the mobile unit from base stations in its geographical area. The measured quantities are correlated with known triangulation techniques to locate the x, y coordinate position of the mobile unit.

Global positioning systems have been used with a mobile receiver that determines its position by detecting the time of arrival of signals transmitted by satellites. Such systems are not employed to detect the position of a mobile transmitter in relation to spatially disposed base stations.

A system has also been developed to locate the position of a mobile cell telephone unit by using the time difference of arrival at base stations of signal bursts provided in the reverse control channel by the mobile unit in initiating a call. In this system the reverse control channel is not available for locating the mobile unit during the call and therefore the position of the mobile unit can be determined only when the call is initiated. The reverse control channel also provides a limited time for accessing position data and therefore it cannot determine a position with accuracy over a substantial time.

The system of the invention uses traffic channel bursts such as the shortened burst to determine the position of the mobile unit. The traffic channel bursts can be used to detect the position of the mobile unit when the call is being set up and for the duration of the call. The system can therefore track the position of a moving unit as the call progresses and can initiate a determination of position at any time during a call. The system can also obtain position data over a substantial time and can therefore achieve a precise location of position. Moreover, the shortened traffic channel burst was designed to be used for adjusting the timing of time slots and it is therefore well suited to make time of arrival signal measurements that are used in locating the position of the mobile unit.

It is therefore an object of the invention to provide an accurate method for determining the position of a mobile cell telephone unit in existing cell communication systems without requiring additional or modified hardware for the mobile units in such systems.

It is another object of the invention to provide a system for locating the position of a mobile cell telephone unit during the set up of a mobile call and during the pendency of the call.

It is a further object of the invention to provide such a system which uses the traffic channel shortened burst to locate the mobile unit with respect to spatially disposed base stations in the system.

Another object of the invention is to provide a system wherein the position of the mobile unit is automatically located at the beginning of a call in response to emergency conditions.

A further object of the invention is to provide a system that checks the accuracy of the position locating information for a mobile unit and continues to improve the accuracy of the location of position, if required.

Another object of the invention is to provide a system that allows continued monitoring of the position of a mobile unit as the unit moves.

These and other objects of the invention will become apparent from a review of the following description, drawings and claims.

SUMMARY OF THE INVENTION

Shortened bursts are repetitive signal transmissions that are presently used for synchronizing time slots in cellular telephone networks. The present invention also uses these shortened bursts for locating the position of a mobile unit such as a cellular telephone, for example in case of an emergency or for any other purpose. The invention uses existing equipment to meet new U.S. standards for locating mobile units making emergency calls.

In normal operation of a cellular telephone network, a traffic channel is assigned for communication between a primary base station and a mobile telephone that is located within the cell area of this base station. If it is desired to determine the position of the cellular telephone, the primary base station transmits a command that causes the cell phone to transmit 5.58 millisecond shortened burst signals instead of voice, which repeat every 20 milliseconds, for an interval of no more than 5 seconds. In the system of the invention, these burst transmissions are received by the primary base station and two or more neighboring base stations. The base stations measure the respective times of arrival of the burst signals or make other measurements such as the time difference of arrival of bursts. These measurements are used to compute the distance between each base station and the cell phone.

The location of the cell phone is determined by triangulating the distance measurements of the base stations. The triangulation computations are made by the primary base station, a mobile switching center, a mobile positioning center, a police emergency dispatch center, or any other network locus that communicates with the base stations. If necessary, the triangulation process can be repeated for additional five second burst intervals on the same or a new traffic channel if greater positional accuracy is required. This system can satisfy new federal standards for emergency position location with just software changes in the central network.

THE PREFERRED EMBODIMENTS

The present invention provides a technique for determining the geographic position of a mobile terminal or unit in a IS-54 or 136 cellular telephone system, in either analog control channel (IS-54) or digital control channel (IS-1 36) modes, using existing mobile units and using known signaling protocols. A known signaling protocol uses shortened bursts with sequences of up to about 5.58 milliseconds each, which repeat every 20 milliseconds. These bursts are used to synchronize or align the timing (i.e., the time slot) of a mobile unit or terminal to that of the base station with which it is communicating.

In an IS-54 system, the control channel is analog and shortened bursts are always transmitted upon initiation of a call. In an IS-136 system, shortened bursts are triggered by setting an appropriate field in the downlink traffic channel designation or assignment message from a base station. Normally, the mobile unit will begin transmitting shortened bursts as soon as it is given a traffic channel assignment if it is so directed by the network base station as a part of a traffic channel assignment message. The mobile unit will continue making such transmissions for up to five seconds, until it receives a time slot alignment signal from the base station. After that, the mobile station transmits and receives in accordance with the time alignment of its base station. Existing mobile units routinely broadcast the shortened bursts and other traffic channel bursts, and existing base stations routinely receive them during normal operations. These known traffic channel bursts can be used in a new position locating system for mobile units such as cellular telephones. The shortened bursts, voice channel bursts or other reverse control messages on the traffic channel can therefore be used to locate the position of the mobile unit. The voice channel or other reverse control messages of the traffic channels have comparatively shorter sequences of known bits than the shortened burst and are therefore not as suitable as the shortened burst for locating the position of a mobile unit. These other traffic channel bursts could be used in combination with the shortened burst to provide increased accuracy in detecting the position of the mobile unit.

Figure 1:
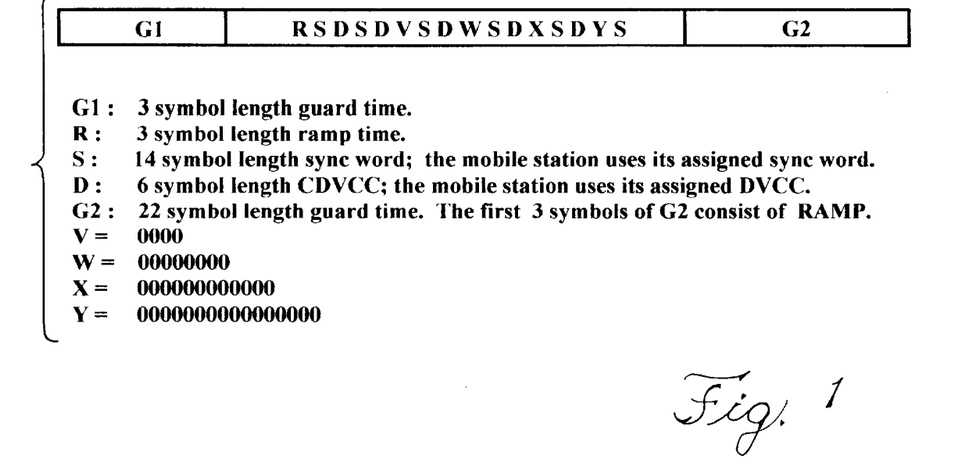
FIG. 1 is a symbolic illustration of a known shortened burst transmission that has been used for time alignment or synchronization between base stations and mobile units.

The standard form of a shortened burst is shown in FIG. 1. This burst is well suited to determine the position of a mobile unit. The 134 bits of this burst uniquely identify the mobile unit. The guard times of the shortened burst ensure that the transmissions of one unit will not interfere with the transmissions of another unit. Moreover, the burst has six sync sequences that are disposed at different spacings within the burst. This makes the burst particularly well suited for use in detecting position information such as the time of arrival of the burst at a base station.

The known bits of the shortened burst signals within slots in a TDMA block can be easily detected by base stations to accurately determine the time of arrival of these bursts. The repetition of the burst signals themselves or in combination with other traffic channel bursts allows further increased precision of measurement by averaging. The presence of known bits also allows more flexibility and better performance than if the bits were unknown.

In normal operation of a TDMA system, when a call is first set up from a mobile unit or terminal through a base station, the mobile unit derives its timing reference from the signals that it sees on the downlink control channels of the system, i.e., from information transmitted by the base station. The transmission timing from various mobile units can be different, causing transmissions of different mobile units to arrive at different times at the base station. The shortened burst is used to synchronize transmissions between a base station and the mobile units that communicate with the base station. In IS-136 systems, the mobile unit transmits the shortened burst for time alignment purposes when the initial traffic channel assignment is made or when a handoff between base stations occurs, if a flag is set on a traffic channel designation message. The shortened burst has guard times to avoid interfering with other mobile units prior to synchronization of communications with the base station.

Figure 2A:
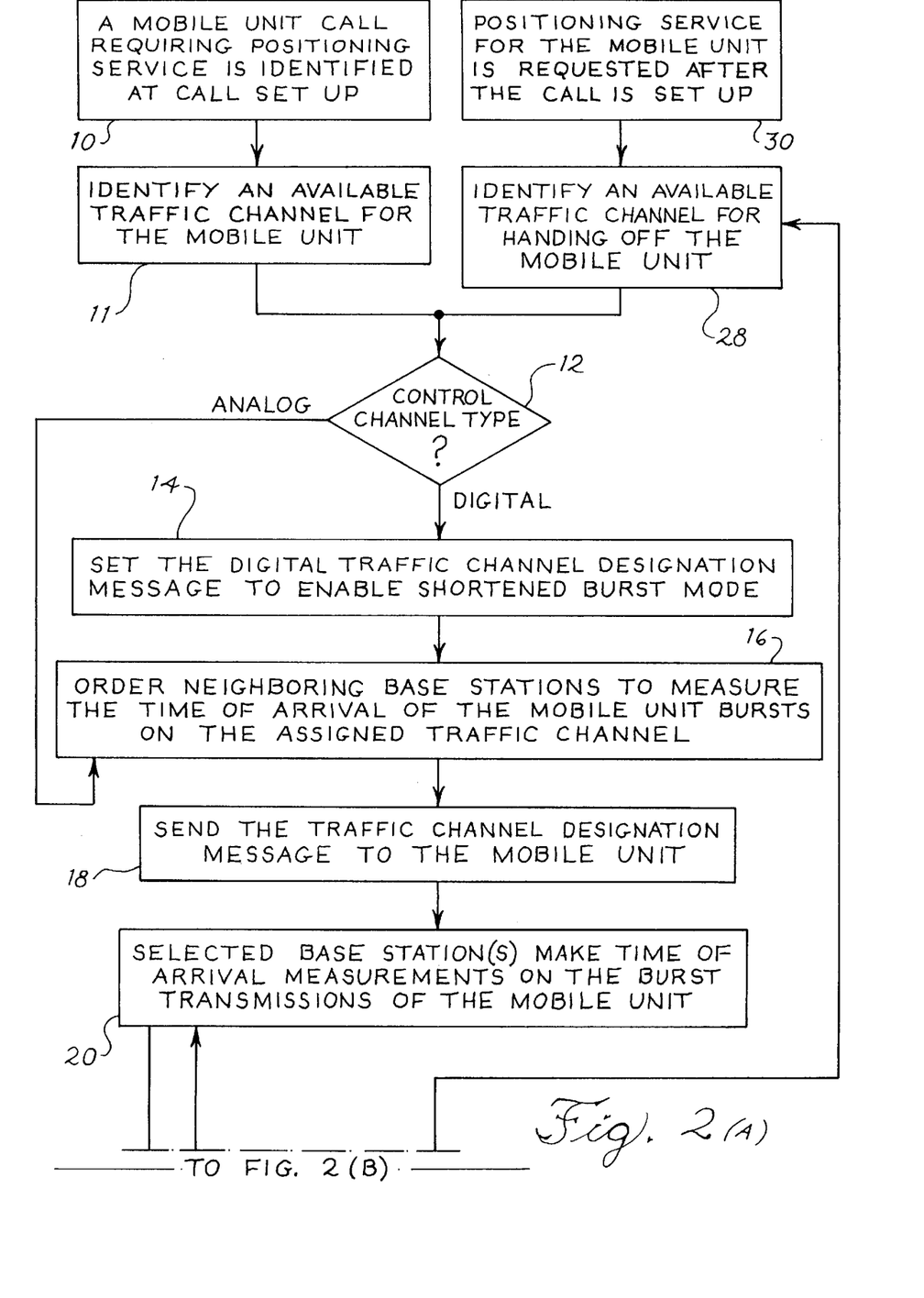
FIGS. 2A and 2B are a flow chart of the steps of the invention for locating the position of a mobile unit in an IS-54 or -136 TDMA system.
Figure 2B:
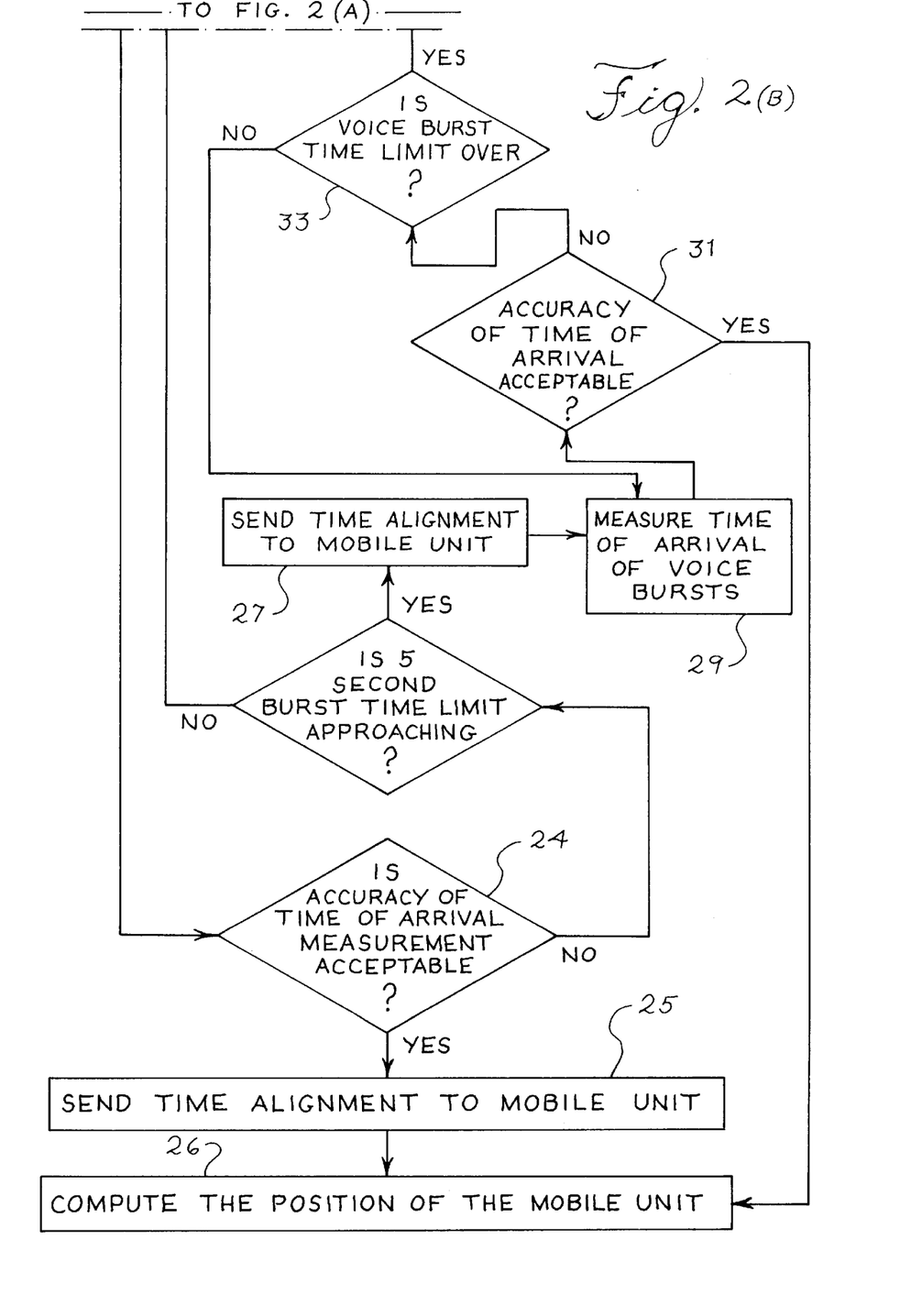

FIGS. 2A and 2B show one form of the method of the invention wherein existing mobile telephones, base stations and cellular network equipment are used with shortened bursts and other traffic channel bursts to locate a mobile unit. When a base station receives a call 10 requiring or requesting a position location, for example when the mobile unit dials 911 for an emergency call or a position location is requested for any purpose in setting up the call, the base station first identifies an available traffic channel for the mobile unit at 11 and then determines at 12 if the control channel is analog (i.e., operating in IS-54) or digital (i.e., in IS-136). If the control channel is digital, the base station at 14 sets the traffic channel designation or assignment message to enable the shortened burst mode. The shortened burst mode is enabled by setting the SB field to 1 in the Digital Traffic Channel Designation Message.

The format of the Digital Traffic Channel Designation Message is shown in the following chart:

| Information Element | Reference | Type | Length |
| --- | --- | --- | --- |
| Protocol Discriminator | | M | 2 |
| Message Type | | M | 6 |
| DVCC | IS-136.2 | M | 8 |
| DMAC | IS-136.2 | M | 4 |
| CHAN | | M | 11 |
| ATS | | M | 4 |
| SB | | M | 1 |
| Protocol Version | | M | 4 |
| Time Alignment | | M | 5 |
| Delay Interval Compensation Mode | | M | 1 |
| Voice Mode | | O | 10 |
| Subaddress | | O | 20–180 |
| Message Encryption Mode | | O | 13 |
| Hyperband Info | | O | 6 |
| Display | | O | 12–668 |

If the control channel is analog, the mobile unit transmits shortened bursts by default. The primary or serving base station at 16 directs at least two neighboring base stations to measure the time of arrival of shortened burst signals from the mobile unit on the assigned traffic channel. In urban areas, two or more such neighboring stations may be required for accurate triangulation of a position to within 125 meters or less.

In remote areas near uninhabited or untravelled zones, two neighboring base stations may not be available. In this case, measurements related to distance or range could be combined with angle of arrival measurements for the burst signals received at the primary and/or additional one neighboring station to determine the position of the mobile unit. Angle of arrival could be determined, for example, by using multiple antenna elements at the primary base station and/or additional base station. Alternatively, the position could be determined with less than three base stations by eliminating possible points of origin by reference to geographical information. For example, a possible point of origin could be eliminated if it would result in transmission from a volcano, a body of water, a prohibited military zone, or the like.

Once the neighboring base stations are activated, the primary base station (i.e., the one principally communicating with the mobile unit) sends the traffic channel designation to the mobile unit at 18. This transmission enables the shortened burst mode of the mobile unit for a digital control channel and continues the shortened burst transmissions for an analog channel. The mobile unit then transmits its bursts in regularly-assigned slots to the primary base station, and the selected neighboring base stations also pick up the signal. Each receiving base station measures at 20 the time of arrival or some other distance related parameter of the shortened burst transmissions which are indicative of the distance from the mobile unit to each base station.

The several base stations report their time measurements of the bursts to the primary base station, or each of them reports to a mobile positioning center (MPC), a switching center, a police dispatch center or other such central controlling station, which at 24 determines the accuracy of the measurements from each station. If the accuracy of the measurements from all the selected base stations is determined to be sufficient, the primary base station is caused to send a time alignment signal to the mobile unit at 25 for synchronizing the time slots of the mobile unit to the primary base station. The measurements are then used at the controlling station to determine at 26 the position of the mobile unit.

If one or more of the time of arrival measurements for the mobile unit are not sufficiently accurate, the base stations continue to make time of arrival measurements for subsequent bursts until a sufficiently accurate measurement is obtained, or the five second time limit or some selected shorter time limit approaches. If the time limit approaches without a satisfactory measurement, the primary base station sends the time alignment value to the mobile unit at 27. In one embodiment, the system could thereafter identify a useable traffic channel at 28 for handing off the mobile unit. This channel could be the same as was previously employed or a different channel could be used. The process for detecting the position of the mobile unit could then be repeated starting at 12 and could be continued in the described manner until a sufficiently accurate position is determined. This operation would have the disadvantage of providing two or more consecutive five second shortened burst transmissions which could result in an undesirably long interruption of the voice transmission of a call. This problem can be avoided by using voice bursts to enhance the accuracy of the detection of position if the position cannot be located with sufficient accuracy by shortened bursts continuing for five seconds or some other set time.

As shown in FIG. 2, the accuracy of the position measurement can be enhanced without using additional consecutive five second shortened bursts, if voice bursts containing voice traffic transmissions are used to provide continuing position measurements. This operation is achieved by measuring the time of arrival of voice bursts at 29 after the time alignment is sent at 27 to the mobile unit. The accuracy of these measurements is checked at 31 and, if the accuracy is acceptable, the position of the mobile unit is computed at 26. If the accuracy is not acceptable, a voice burst time limit of, for example five seconds, is checked. If the time limit has not been reached, the system continues to measure the time of arrival of voice bursts until the voice burst time limit is reached or an acceptable position measurement is achieved. If the voice burst time limit is reached, an available traffic channel is identified at 28 and the system again uses the shortened bursts to detect the position of the mobile unit. This process can continue until the position of the mobile unit has been detected with sufficient accuracy.

Where a call is identified as one requiring position location by the mobile unit or the primary base station after the call is set up, as at 30, then the primary base station identifies at 28 a traffic channel for the call. The process for locating the mobile unit then continues, beginning at 12, as previously discussed.

Figure 3:
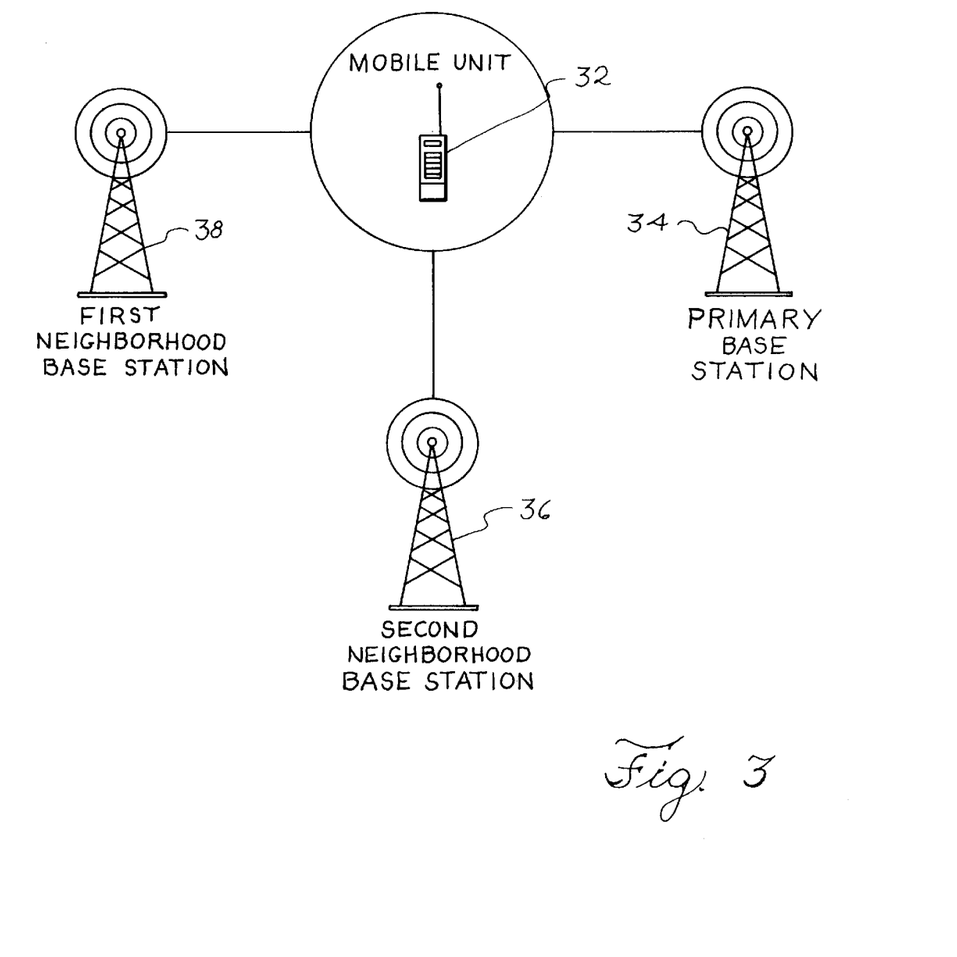
FIG. 3 is a diagrammatic illustration of a mobile unit and associated base stations in the system of the invention.

The procedure for utilizing time of arrival measurements to calculate the location of the mobile unit will hereafter be explained. To briefly summarize, with reference to FIG. 3, the coordinate position of the location of the mobile unit 32 can be expressed as a function of the time it takes the signal to travel from the mobile unit to any base station 34, 36 or 38. This relationship is expressed as follows:

$$tc = \sqrt{\sqrt{(x_{bcx})^2 + (y_{bs-y})^2}} \qquad \text{Eq. (1)}$$

where t is the time it takes the transmission from the mobile unit to reach the base station, c is the speed of light, (x,y) is the coordinate position of the mobile unit, and ($x_{bs}$, $y_{bs}$) is the coordinate position of the base station. The transmission time is equal to the difference between the time of arrival of the signal at the base station and the time the signal was transmitted from the mobile unit. Thus, Equation 1 can be rewritten as follows:

$$(t_R - t_T)c = \sqrt{\sqrt{(x_{bs-x})^2 + (y_{bs-y})^2}} \qquad \text{Eq. (2)}$$

where $t_R$ is the time the signal is received at the base station and $t_T$ is the time the signal was sent by the mobile unit. Equation 2 has three unknowns: time of transmission $t_T$, the x-coordinate of the mobile unit, and the y-coordinate of the mobile unit. If measurements are taken at three base stations 34, 36 and 38, three equations can be generated with the same three unknowns in each equation. In each equation, the values for receive time $t_R$, base station x coordinate, and base station y coordinate will be different. These equations can be solved using known algebraic techniques to obtain the x and y coordinate of the mobile unit.

When tracking of the mobile unit is required, a well known Kalman filter tracking approach may be used. To ensure accuracy of the calculations, the Kalman filter tracking approach automatically gives the standard deviation for the calculated estimate of the position of the mobile unit. The standard deviation can be used in a known manner to evaluate the accuracy of the position calculation.

Alternatively, or in addition, the base stations may take quality measurements of the signal received from the mobile unit. For example, each base station may measure the signal strength (RSSI) of the signal received from the mobile unit. The signal quality measurements are transmitted to the primary base station or other controlling station along with the time measurements that are used for the position calculations. The controlling station may use the signal quality measurements to perform a quality check. If the accuracy of the measurements is not sufficient to obtain the desired degree of accuracy in the calculation of the mobile unit's position, the measurement process can be repeated. To repeat the measurement process, the controlling station would command the primary base station 34 to repeat the control message. After repeating the control message, the primary base station and surrounding base stations 36 and 38 would again check the standard deviation and/or take measurements of the control message response from the mobile unit and pass the new measurements to the controlling station. This process can be repeated as many times as necessary until the desired degree of accuracy is obtained. After calculating the position of the mobile unit, the controlling station transmits the mobile unit's location to an emergency call center or other application processing center.

Variations in the methods, signals, slots and the like used will not depart from the scope and spirit of the invention. For example, a time difference of arrival method or other method of distance measurement could be used to measure the distance from the base stations to the mobile unit, without departing from the invention. Also, different tests could be used to determine the accuracy of position measurements, and traffic channel bursts other than the shortened bursts and voice bursts could be used to measure the position of the mobile unit. All such variations that come within the scope of the appended claims also come within the scope of this invention.

We claim as our invention:

1. A method for detecting the position of a mobile communication unit in a communication system having a plurality of spatially dispersed base stations, the system using a shortened traffic channel burst transmission from the mobile unit, the method comprising the steps of:
   a) transmitting shortened traffic channel burst signals from the mobile unit to a primary base station and a plurality of other neighboring base stations;
   b) measuring a distance related characteristic of the shortened traffic channel burst signals from the mobile unit to said primary base station and said plurality of neighboring base stations;
   c) detecting the accuracy of said measurements;
   d) when the accuracy of said measurements is not acceptable, continuing steps a through c until an accurate measurement is achieved or a defined time has passed; and
   e) when the accuracy of said measurements is acceptable, calculating the position of the mobile unit from said measurements.

2. The method of claim 1, wherein the requirement of locating a position is identified when said mobile unit sets up a call serviced by said primary base station.

3. The method of claim 1, wherein the requirement of locating a position is identified after a call is set up for the mobile unit by the primary base station.

4. The method of claim 1, wherein the system operates under IS-54.

5. The method of claim 1, wherein the system operates under IS-136, and further includes the step of sending the signal to the mobile unit that enables the unit to transmit a shortened traffic channel burst.

6. The method of claim 1, further including the step of said neighboring base stations and primary base station measuring the time of arrival of the bursts from the mobile unit.

7. The method of claim 1, further including the step of said neighboring base stations and primary base station measuring the time difference of arrival of the bursts from the mobile unit.

8. The method of claim 1, wherein said measurements are continued and are used to track the mobile unit.

9. A method for locating the position of a mobile communication unit in a mobile communications system that includes a plurality of base stations, the system using shortened burst transmissions on the traffic channel from the mobile unit to a primary base station and corresponding responsive time alignment signals from the primary base station that synchronize communications between the primary base station and the mobile unit, the method comprising the steps of:
   selecting at least two neighboring base stations in the geographical vicinity of said mobile unit;
   said neighboring base stations receiving said shortened bursts from said mobile unit;
   using at least one signal of the shortened bursts to determine the distance of the primary and neighboring base stations from said mobile unit; and
   calculating the location of the mobile unit from said distances.

10. The method of claim 9, including the further step of identifying the nature of the control channel used by the mobile unit as analog or digital, and in the event the channel is digital, setting the traffic channel designation to enable a shortened burst mode of operation by said mobile unit.

11. The method of claim 9, wherein the step of calculating the location of the mobile unit is accomplished at the primary base station.

12. The method of claim 9, wherein the requirement of locating the position of the mobile unit is identified when the mobile unit sets up a call serviced by said primary base station.

13. The method of claim 9, wherein the requirement of locating the position of the mobile unit is identified after a call is set up for the mobile unit by the primary base station.

14. The method of claim 9, wherein the system operates under IS-54.

15. The method of claim 9, wherein the system operates under IS-136, and further includes the step of sending a traffic channel designation message to the mobile unit that enables the unit to transmit said shortened burst.

16. The method of claim 9, further including the steps of measuring the time of arrival of the signals of said shortened bursts, and determining the distance based upon the time of arrival measurements.

17. The method of claim 9, further including the step of measuring the time difference of arrival of the signals of the shortened bursts between the mobile unit and the primary and neighboring base stations, and determining the distances between the mobile unit and these base stations based upon the time difference of arrival measurements.

18. The method of claim 9, wherein the distance measurements are continued and are used to track the mobile unit.

19. The method of claim 9, further including the steps of:
   combining measures of distance derived from shortened burst transmissions and terminating the combining if the measures of distance are not found to be sufficiently accurate after a defined time;

aligning and synchronizing a time slot of the mobile communication unit;

generating voice burst signals by the mobile communication unit;

deriving from at least one voice burst signal received by each of a plurality of base stations a measure of the distance of the mobile communication unit from the base stations; and determining the location of said mobile communication unit from sufficiently accurate measures of distance for at least one signal of the voice burst.

20. The method of claim 9, further including the step of evaluating the accuracy of the distance measurements and calculating the location of the mobile unit only after the measurements have been determined to be sufficiently accurate.

21. The method of claim 20, further comprising the steps of:

aligning the time slot of the mobile unit if sufficient accuracy of the distance measurements for shortened burst signals is not achieved within a set time;

generating voice bursts by the mobile unit; and calculating the location of the mobile unit from sufficiently accurate distance measurements for at least one of said voice bursts.

22. The method of claim 20, further including the step of initiating the transmission of shortened bursts from the mobile unit if the distance measurements derived from the voice bursts are not sufficiently accurate.

23. A method for locating the position of a mobile communication device that operates with a network of spatially disposed base stations, the method comprising the steps of:

using the network to cause the mobile communication device to transmit voice burst signals suitable for deriving position information;

receiving said voice burst signals at a plurality of said base stations;

deriving from at least one voice burst signal received by each base station a measure of the distance of the mobile communication device from the base station;

combining a plurality of said measures of distance;

determining the accuracy of the combined measure of distance based on a standard deviation derived from previous combined measures of distance;

terminating the combining of the measures of distance if the measures of distance are not found to be sufficiently accurate after a defined time;

determining the location of said mobile communication device from the combination of sufficiently accurate measures of distance for at least one signal of the voice burst; and aligning and synchronizing a time slot of the mobile communication device.

24. The method of claim 23, wherein said step of deriving includes detecting the time of arrival of said at least one burst signal and said step of determining includes using the times of arrival for at least three base stations to solve at least three equations for the x, y spatial coordinates of said mobile communication device.

25. The method of claim 23, wherein said step of deriving includes detecting the time difference of arrival of said at least one burst signal with respect to at least three base stations, and said step of determining includes using these time difference of arrival measurements to solve at least three equations for the x,y spatial coordinates of said mobile communication device.

26. The method of claim 23, wherein said step of transmitting includes transmitting shortened burst signals from said mobile communication device.

27. The method of claim 23, wherein said measure of distance is the time of arrival of at least one signal of the burst at each one of a plurality of said base stations.

28. The method of claim 23, wherein said measure of distance is the time difference of arrival of at least one signal of the burst at a plurality of base stations.

29. The method of claim 23, further including the step of initiating the transmission of shortened bursts from the mobile communication device if the measures of distance derived from the voice bursts are not sufficiently accurate.

30. The method of claim 23, wherein said network operates in accordance with IS-54.

31. The method of claim 23, wherein said network operates in accordance with IS-136, and further includes the step of sending a traffic channel designation message to the mobile communication device that enables the device to transmit a shortened voice channel burst.

32. The method of claim 23, wherein the measurements of distance are continued and are used to track the mobile communication device.

33. The method of claim 23, further including the step of using the angle of arrival of the burst signals at said base stations to calculate the location of the mobile device.

34. The method of claim 23, further including the step of eliminating possible locations of the mobile communication device based upon known geographical characteristics of a possible location.

35. A method for locating the position of a mobile communication unit in a mobile communications system that includes a plurality of base stations, the system using shortened burst transmissions on the traffic channel from the mobile unit to a primary base station and corresponding responsive time alignment signals from the primary base station that synchronize communications between the primary base station and the mobile unit, the method comprising the steps of:

selecting at least two neighboring base stations in the geographical vicinity of said mobile unit;

said neighboring base stations receiving said shortened bursts from said mobile unit;

using at least one signal of the shortened bursts to determine the distances of the primary and neighboring base stations from said mobile unit;

evaluating the accuracy of the distance measurements;

aligning a time slot of the mobile unit if sufficient accuracy of the distance measurements for shortened burst signals is not achieved within a set time; and calculating the location of the mobile unit from sufficiently accurate distance measurements for at least one of said bursts.

36. The method of claim 35, further including the step of initiating the transmission of voice bursts from the mobile unit if the distance measurements derived from the shortened bursts are not sufficiently accurate.

37. A method for locating the position of a mobile communication device that operates with a network of spatially disposed base stations, the method comprising the steps of:

using the network to cause the mobile communication device to transmit voice burst signals suitable for deriving position information;

receiving said voice burst signals at a plurality of said base stations;

deriving from at least one voice burst signal received by each base station a measure of the distance of the mobile communication device from the base station;

combining a plurality of said measures of distance;

terminating the combining of the measures of distance if the measures of distance are not found to be sufficiently accurate after a defined time;

determining the location of said mobile communication device from the combination of sufficiently accurate measures of distance for at least one signal of the voice burst;

aligning and synchronizing a time slot of the mobile communication device; and initiating the transmission of shortened bursts from the mobile communications device if the measures of distance derived from the voice bursts are not sufficiently accurate.

* * * * *

UNITED STATES PATENT AND TRADEMARK OFFICE
CERTIFICATE OF CORRECTION

PATENT NO. : 6,243,588 B1 Page 1 of 1
APPLICATION NO. : 09/037988
DATED : June 55, 2001
INVENTOR(S) : Koorapathy et al.

It is certified that error appears in the above-identified patent and that said Letters Patent is hereby corrected as shown below:

Title page, item [75]:
The second inventor's first name, "Patrick", should be -- Patrik --.

Signed and Sealed this

Twenty-second Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,243,588 B1  Page 1 of 1
APPLICATION NO. : 09/037988
DATED : June 5, 2001
INVENTOR(S) : Koorapathy et al.

It is certified that error appears in the above-identified patent and that said Letters Patent is hereby corrected as shown below:

Title page, item [75]:
The second inventor's first name, "Patrick", should be -- Patrik --.

This certificate supersedes Certificate of Correction issued August 22, 2006.

Signed and Sealed this

Tenth Day of October, 2006

JON W. DUDAS
*Director of the United States Patent and Trademark Office*